J. HARLEY.
MEANS FOR ADJUSTING CYLINDER PACKINGS.
APPLICATION FILED FEB. 23, 1910.
980,518.
Patented Jan. 3, 1911.
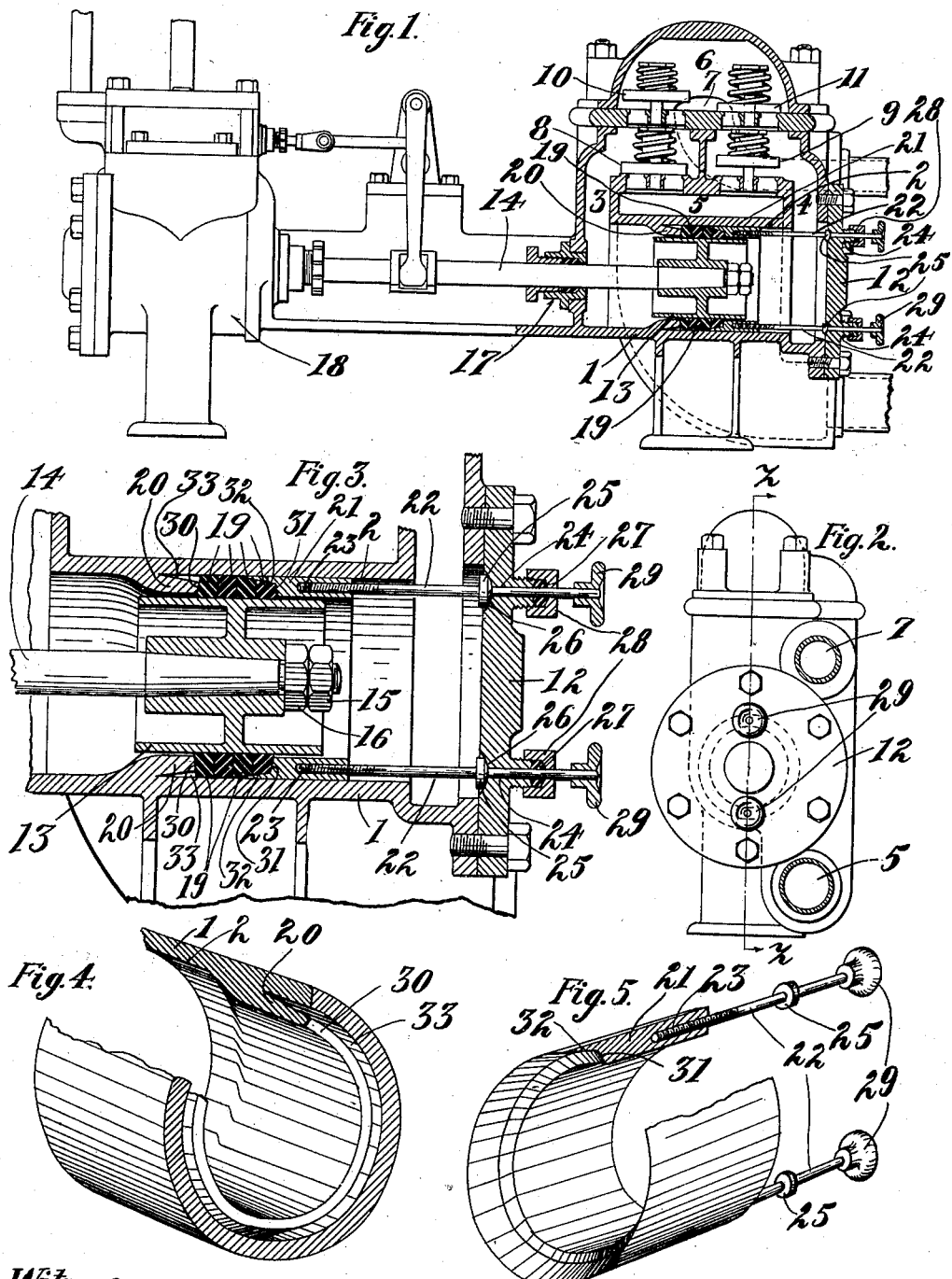
Witnesses:
Jacob A. Hollander
Lillian Burnett
Inventor:
John Harley

UNITED STATES PATENT OFFICE.

JOHN HARLEY, OF CINCINNATI, OHIO.

MEANS FOR ADJUSTING CYLINDER-PACKINGS.

980,518.  Specification of Letters Patent.  Patented Jan. 3, 1911.

Application filed February 23, 1910. Serial No. 545,319.

*To all whom it may concern:*

Be it known that I, JOHN HARLEY, a citizen of the United States, residing at Cincinnati, in the county of Hamilton and State of Ohio, have invented certain new and useful Improvements in Means for Adjusting Cylinder-Packings, of which the following is a specification.

My invention relates to means for adjusting cylinder packings, and is primarily applicable to the packing between the cylinder and piston of a pump, such as a water pump, but is also applicable in other relations in which there is travel between a piston and a cylinder.

My invention consists in providing a packing on the inner face of the cylinder arranged to contact the piston, a follower for the packing, and means for adjusting the follower, the latter means extending to outside the cylinder for enabling manipulation of the follower and taking up of the packing from the outside of the cylinder.

My invention will be further readily understood from the following description and claims, and from the drawings, in which latter:

Figure 1 represents an axial vertical section of my improved device, shown applied to a pump, part of the pump being in side elevation, the section being taken on the line $z$—$z$ of Fig. 2. Fig. 2 is an end view of the same. Fig. 3 is an enlarged vertical section of my improved device on the line $z$—$z$ of Fig. 2. Fig. 4 is a perspective view, partly in section, of a detail of the cylinder; and, Fig. 5 is a perspective view, partly in section, of the follower and screw-rods therefor.

1 represents a casing which has a cylinder-bore 2 therein for forming a cylinder. In the form shown there are usual water passages 3 4 communicating with the respective ends of the cylinder.

5 is an inlet-port.

6 is a dome, and 7 is an outlet-port.

8 and 9 are inlet-valves and 10 and 11 are outlet-valves.

12 is the usual removable head in line with the cylinder.

13 is the piston which has movement in the cylinder. It is connected with a piston-rod 14 by nuts 15 16. The piston-rod is slidable in a bearing 17 and is operated from a usual piston in a steam-chest 18, not more particularly shown because well known.

19 is a packing between the wall of the cylinder-bore and the piston, and is shown in the form of rings. Positioning means are provided for one end of the packing, shown as an annular rib 20 which encircles the piston. 21 is a follower between which and the annular rib the packing is received.

Means are provided for causing movement of the follower toward the rib, which are shown operated from the outside of the cylinder so that the wear of the packing may be taken up without dismantling the piston or cylinder. I have shown these means as comprising a plurality of screw-rods 22, the threaded ends of which are received in threaded holes 23 of the follower. I have shown two of these rods, each passing through a bearing 24 in the head. The rod is provided with a collar 25 which is received in a recess 26 at the bearing 24 for forming a joint, preferably a ground joint, between the screw-rod and the head for providing a tight joint between the same. At its outer end the rod has a gasket 27 thereabout. A threaded cap 28 is received about the threads of the bearing 24 whereby the gasket is compressed and aids in forming a tight connection between the head and rod. The outer end of the rod is provided with turning means, as a hand-wheel 29.

The opposing faces of the rib and follower are preferably formed with an inward taper, as shown by the tapered face 30 on the rib and tapered face 31 on the follower, whereby, when the follower is caused to move inwardly, the packing is pressed toward the piston. For further aiding in forcing the packing toward the piston I prefer to provide a wedge 32, shown as an annular wedge, received outside the packing and arranged to be accommodated in a corresponding recess 33. I have shown this wedge on the follower as an inwardly extending reduced portion or flange on the same, the recess being between the rib 20 and the wall of the cylinder-bore.

When the follower is moved inwardly, the packing is compressed between the follower and the rib, the opposed tapering faces on the follower and rib crowding the packing toward the piston, the wedge actively forcing the packing inwardly, the recess 33 accommodating the wedge so that the necessity of renewal of the packing may be avoided until the entire packing is practically used up, and thereby delaying the necessity of renewal of the same.

My improved device provides ready means whereby the packing is readily adjusted and maintained in proper contact with the piston by slight adjustments from time to time which are readily made without removal of the parts by means within ready reach so that all leaking between the piston and cylinder may be avoided during operation, the sliding connection between the piston and cylinder being thus maintained in continuous working condition for producing best results. My improved device also provides means whereby the adjustment of the packing may be made during operation of the piston, thus adjusting the same during true working conditions and obtaining the best results for successful operation.

Having thus fully described my invention, what I claim as new and desire to secure by Letters Patent is:

1. In means for adjusting a cylinder packing, the combination of a casing having a cylinder bore therein, a piston in said bore, a packing between the wall of said cylinder bore and piston, said cylinder bore having means therein for positioning one end of said packing, a follower in said cylinder bore for the other end of said packing provided with an inwardly extending portion which is wedge-shape in cross-section and the wedge-face whereof is at an extremely acute angle with relation to the outer face thereof, the said wedge-shape portion being of substantially greater length than thickness and forming an annular flange on said follower received to substantial extent lengthwise outside said packing, the diameter of said wedge-shape portion at the apex of said wedge being as great as the diameter of the periphery of said packing, whereby said packing is crowded toward said piston from the outside thereof, and means for adjusting said follower, substantially as described.

2. In means for adjusting a cylinder packing, the combination of a casing having a cylinder bore therein, a piston in said bore, a packing between the wall of said cylinder bore and piston, said cylinder bore having means therein for positioning one end of said packing, a follower in said cylinder bore for the other end of said packing, the said positioning means and follower having opposed walls between which said packing is compressed, the said last-named walls being cross-sectionally formed for sloping away from each other toward the longitudinal axis of said piston, the said follower being provided with an inwardly extending reduced portion which is wedge-shape in cross-section and the wedge-face whereof is at an extremely acute angle with relation to the outer face thereof, the said last-named wedge-shape portion being of substantially greater length than thickness and forming an annular flange on said follower received to substantial extent lengthwise outside said packing, whereby said packing is crowded toward said piston from the outside thereof, the angles of said wedge-face and opposed wall on said follower being relatively obtuse angles, and means for adjusting said follower, substantially as described.

3. In means for adjusting a cylinder packing, the combination of a cylinder, a removable head therefor, a piston in said cylinder, a packing between said cylinder and piston, said cylinder being provided with positioning means for one end of said packing, an annular follower received between said piston and cylinder, rods having threaded connection within said follower and journal-connection with said head located outside the longitudinal projection of said piston, and turning means for said rods, substantially as described.

4. In means for adjusting a cylinder packing, the combination of a cylinder, a removable head therefor, a piston in said cylinder, a packing between said cylinder and piston, said cylinder being provided with an annular positioning ring for one end of said packing, an annular follower received between said piston and cylinder, a plurality of rods having threaded connections with said follower within the body of said follower and having journal connections with said head, said rods, threaded connections and journal connections being outside the longitudinal projection of said piston, endwise limiting means between said rods and head for causing said follower to move outwardly with said head upon removal of said head, and turning means for said rods outside said head, substantially as described.

5. In means for adjusting a cylinder packing, the combination of a cylinder, a removable head therefor, a piston in said cylinder, a packing between said cylinder and piston, said cylinder being provided with an annular positioning ring for one end of said packing, an annular follower received between said piston and cylinder, said annular follower having an inner portion which is wedge-shape in cross-section and the apex of the wedge whereof is of as great diameter as the diameter of said packing and is entirely outside said packing, said follower being provided with threaded sockets, rods having threaded inner ends received and adjustable in said sockets, said rods having journal connections with said head, the said rods, threaded sockets and journal connections being outside the longitudinal projection of said piston, the said rods having collars thereon at the inner ends of said journal connections, there being ground joints between said collars and heads, and hand-wheels at the outer ends of said rods outside said head for turning said rods and thereby adjusting said follower in either direction longitudinally of said piston, substantially as described.

In testimony whereof, I have signed my name hereto in the presence of two subscribing witnesses.

JOHN HARLEY.

Witnesses:
EDWARD SOUTHWORTH,
JACOB A. HOLLANDER.